Nov. 10, 1953  S. ATCHASON  2,658,695
PROCESS AND APPARATUS FOR MANUFACTURING
ARTICLES FROM STRIP STOCK
Filed June 21, 1950  2 Sheets-Sheet 1
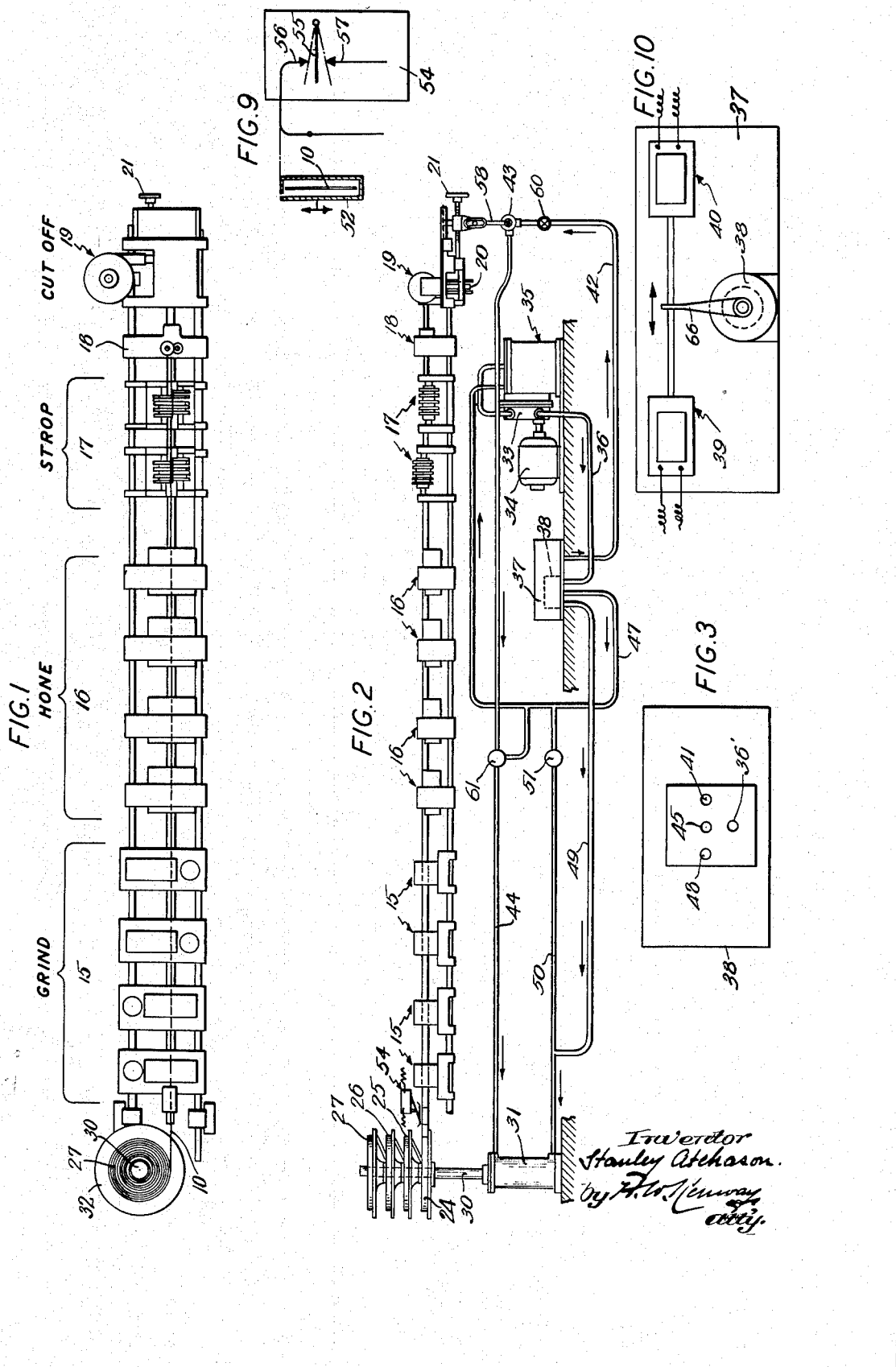

Nov. 10, 1953 — S. ATCHASON — 2,658,695
PROCESS AND APPARATUS FOR MANUFACTURING ARTICLES FROM STRIP STOCK
Filed June 21, 1950 — 2 Sheets-Sheet 2
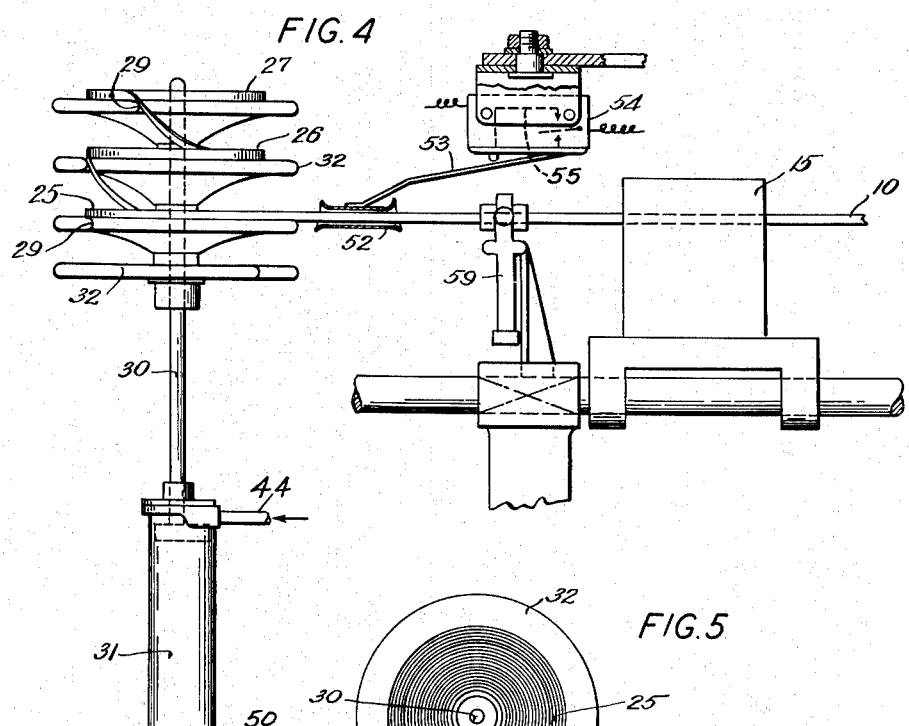
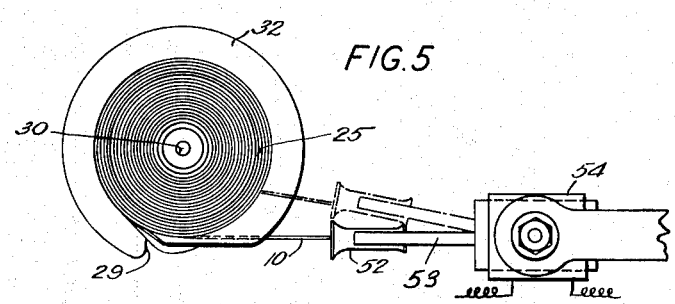
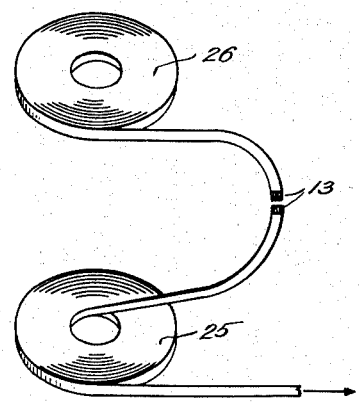
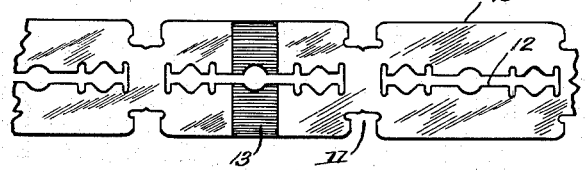
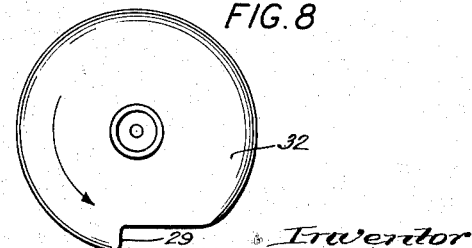
Inventor
Stanley Atchason
by H. W. Kenway
Atty.

Patented Nov. 10, 1953

2,658,695

UNITED STATES PATENT OFFICE 2,658,695

PROCESS AND APPARATUS FOR MANUFACTURING ARTICLES FROM STRIP STOCK

Stanley Atchason, Somerville, Mass., assignor to The Gillette Company, a corporation of Delaware Application June 21, 1950, Serial No. 169,449

12 Claims. (Cl. 242—78)

This invention relates to the manufacture of articles from continuous strip stock and comprises a new and improved process of handling such stock in coil form and the novel mechanism for that purpose.

One important field of use for the invention is in the manufacture of safety razor blades and the invention will be herein described in its application to that field although it will be apparent that it is not limited to that or to any specific field.

In the manufacture of safety razor blades, it is the practice to employ strip or ribbon steel, accurately dimensioned as to width and thickness in length of several hundred feet wound in flat coil. Such a coil is supported for rotation and the strip steel drawn from it continuously as required for the various steps of the manufacturing process such as the sharpening, tempering, punching, etc., and in the final stage of manufacture the substantially completed blades are severed from the advancing end of the processed strip. Heretofore it has been necessary to suspend operations whenever the trailing end of a coil has been reached, to bring a new coil into place and usually to weld the leading end of the new coil to the trailing end of the used-up coil before the latter is drawn into the machine.

If the strip is being processed in automatic machinery, for example in sharpening machinery, the necessity of stopping to weld the end of a new coil results in a loss of machine production time and spoilage of the blades which remain stationary in the machine while the welding operation is carried out. Some additional spoilage also results in starting the material of the new coil since the delicate adjustment of the machine is disturbed and time is required for readjusting it.

To meet these objections and to keep this spoilage and downtime of the machine to a minimum, it has been the practice to build up coils of as large diameter as possible by welding together the material of several smaller coils. This practice requires the small coils to be unwound from their reels and rewound to form the larger coil, and considerable time is wasted because the welding operator is obliged to wait each time for the coil to unwind so that the welding operation may be performed.

The object of the present invention is to obviate the difficulties above discussed and to secure certain other advantages which will be explained hereinafter and which result in important savings in both time and material, eliminate waste and reduce the amount of skilled supervision and attention required in the manufacturing process.

The process of my invention is characterized by mounting two or more coils of strip stock in adjacent relation to rotate simultaneously at the same speed about a common axis, by uniting the trailing end of the strip of one coil with the leading end of the strip of the next adjacent coil, and by shifting one coil into the delivery position formerly occupied by another in preparation to drawing the strip from the coil in the delivery position to which it has been shifted. The coils may be arranged to rotate in parallel horizontal or vertical planes. Preferably the step of uniting the end of the strip of one coil to the end of the strip of the next coil will be carried out before beginning to draw stock from any of the coils. As the operation proceeds and the strip is exhausted from the first coil of the series the second coil is mechanically shifted into delivery position and the operation of the sharpening machine may proceed without interruption until the whole supply of all the coils is exhausted.

The novel mechanism of my invention in its preferred form comprises an axially movable support for holding a series of connected coils for rotation about a common axis together with means operated by engagement with the strip as it passes away from one coil of the series for shifting the support to replace an exhausted coil by a fresh coil of connected strip stock. As herein shown, but not necessarily, this mechanism includes a follower which is arranged to be moved by the strip whenever its path is shifted and automatic mechanism controlled by the follower for mechanically shifting the support at the proper time in the cycle of the process.

The process of my invention may be carried out advantageously with the assistance of this novel mechanism, a preferred embodiment thereof having been selected for purposes of illustration and shown in the accompanying drawings in which:

Fig. 1 is a plan view of a blade-sharpening machine equipped with the coil-handling mechanism.

Fig. 2 is a corresponding view of side elevation.

Fig. 3 is a diagrammatic view of the connections to the controlling valve.

Fig. 4 is a view in side elevation on a larger scale of the coil-handling mechanism apart from the sharpening machine.

Fig. 5 is a corresponding plan view.

Fig. 6 is a view in perspective of two coils of strip stock in position for welding.

Fig. 7 is a plan view of a fragment of the strip stock shown substantially at actual size.

Fig. 8 is a plan view of one of the disks of the coil support.

Fig. 9 is a diagrammatic view of the follower and the switch operated thereby, and Fig. 10 is a diagrammatic view of the control valve and its operating mechanism.

The present invention will be described in its application to the handling of strip steel stock of the character shown in Figs. 6 and 7, that is to say, stock comprising a ribbon of hardened and tempered steel .004" to .007" in thickness and approximately .875" in width. This stock 10 is punched before hardening and in this operation the individual blades are defined by a series of opposed edge notches 11. Each blade in the strip, moreover, is provided with a longitudinal median slot 12 having local enlargements shaped to receive the blade-locating projections of the razors in which the finished blades are to be used. The welded section 13 of the strip unites the coils as indicated in Figs. 6 and 7. These welds are rapidly and accurately formed by overlapping the ends of the two strips in a jig which locates them accurately while the weld is electrically effected. The weld is substantially as strong as the rest of the stock and brings in the leading end of the second coil in exactly the same relation to the instrumentalities of the sharpening machine as the stock of the trailing end of the exhausted coil. The individual blades containing the welded section are eventually thrown out after the weld has served its purpose.

The automatic sharpening machine shown in Figs. 1 and 2 is of conventional design and specifically forms no part of the present invention. It includes a long frame upon which are mounted four grinding wheels 15, one for each corner edge of the strip, four honing wheels 16 similarly arranged, and two stropping wheels 17. Beyond the stropping wheels the frame carries a feeding unit 18 for the strip and at the extreme end of the frame is a cut-off unit 19 by which the individual blades, now completely ground, honed, and stropped, are severed one by one from the advancing end of the strip. The feed unit 18 includes a pair of strip feeding rolls, and these are driven through speed changing mechanism which includes a pulley 20 with adjustable sections controlled as to its effective diameter by a hand wheel 21. The details of this mechanism are not herein shown since they form no part of the present invention, although the hand wheel 21 has an additional function in regulating the operation of the automatic coil shifting mechanism as will presently appear.

The strip stock above-described is supplied to the sharpening machine in the form of flat coils 24, 25, 26 and 27. Two of these coils 25 and 26 are shown in Fig. 6 and all four are shown in Fig. 4.

The coils are carried by a vertical spindle 30 projecting upwardly from a piston (not shown) which works in a cylinder 31 supported adjacent to the stock-receiving end of the sharpening machine. The spindle is provided with a series of spaced collars upon each of which a coil-supporting disk 32 is mounted for free rotation. Each of these disks is provided with an edge notch 29 which permits the strip stock of the coil supported thereon to pass downwardly to the next adjacent coil as suggested in Fig. 4.

As shown in Fig. 2, the lowermost coil 24 is supported at such a level that the strip stock passing to the sharpening machine travels in a direct horizontal path which coincides with the path of the stock through the machine. The stock is drawn continuously through the machine by the feed unit 18 and in this movement the coils are rotated by the pull of the stock as it is unwound. When the lower coil 24 is exhausted, the next higher coil 25 in the series will be lowered to replace it. As herein shown, this is done hydraulically by admitting fluid pressure to the upper end of the cylinder 31.

The hydraulic mechanism includes a pump 33 driven by a motor 34 and connected to an oil reservoir 35. The pump is arranged to discharge oil at full pressure through a pipe 36 to a controlling valve 38 enclosed in a casing 37 as shown in Fig. 2.

The controlling valve 38 as indicated in Fig. 10 is arranged to be operated by a transverse arm 66 connected on the one side to the armature of a solenoid 39 and connected on the other side to the armature of a solenoid 40. In Fig. 3 is indicated the inlet port 36' of the controlling valve 38 as well as its three outlet ports 41, 45, and 48. When the controlling valve is in neutral position as indicated in Fig. 10, the outlet port 45 is opened and oil under pressure is circulated by the pump 33 through the by-pass pipe 47 back to the reservoir 35. When the controlling valve 38 is shifted toward the right as shown in Fig. 10, the discharge port 41 is opened, and oil under pressure is circulated through the pipes 42 and 44 to the head of the cylinder 31, causing the piston and the coils supported by the spindle 30 to move downwardly. The circuit of the pipes 42 and 44 includes an independent valve 60, a valve 43 which is operated in conjunction with the speed control of the sharpening machine and a check valve 61 leading back to the by-pass pipe 47. By these valves the speed of operation of the hydraulic system may be regulated to conform to the speed at which the sharpening machine is operated.

When the controlling valve 38 is moved toward the left, the discharge port 48 is opened, and oil under pressure passes through the pipes 49 and 50 to the lower end of the cylinder 31, thereby raising the piston and the disks 32 supported by the spindle 30 to their highest position in readiness to receive a new series of coils. The pipe 50 includes a check valve 51, and it will be apparent from the foregoing description that when oil under pressure is delivered to the upper end of the cylinder 32, oil discharged from the lower end of the cylinder may find its way back to the reservoir 35 through the system of pipes already described.

The position of the controlling valve 38 is governed by a shift in the path of the strip 10 in a vertical direction as transmitted by a follower 52 which, as shown in Fig. 9, is rectangular in shape and encloses the strip 10, except that it has a slit in one corner through which the strip may be inserted in readiness to draw stock from the lowermost coil when the apparatus is initially set up for operation. The follower shoe 52 is supported by a light switch arm 53 of a switch 54 having a contact arm 55 as shown in Fig. 9. The contact arm 55 normally stands in neutral position midway between contact points 53 and 57, and in this position no current flows through the switch 54. However, when the switch arm 53 is raised, the contact arm 55 is lowered, and circuit closed through the contact point 57, which is in circuit with the solenoid 40 of the control valve 38. When that circuit is crossed, the spindle 30 is lowered, as already explained, until the switch arm 53 is again brought into its initial position. When that occurs, circuit through the contact point 57 is broken, the controlling valve returns to neutral position, and the spindle 30 is located with the next coil of the series at the proper level.

As the switch arm 53 is depressed below its normal position, the contact arm 55 closes circuit through the contact point 56 and the solenoid 39, whereupon the spindle 30 is elevated. A strip guide 59 is mounted on the frame of the machine shown in Fig. 4 being constructed and arranged to establish the predetermined path in which the blade stock 10 passes to the grinding wheels 15. Any deflection of the blade stock in passing from one to another coil takes place outside the guide 59.

It will be seen that in arranging the coils 24—27 upon their respective disks 32, the leading end of each coil is led downwardly through the notch 29 to the inner end of the strip of the next lower coil. Accordingly, at the instant when the strip of the lower coil is exhausted, the wall of the notch 29 immediately draws the strip 10 upwardly toward the level of the next higher disk 32. In this movement, the follower shoe 52 is lifted and the hydraulic mechanism immediately operates to lower the spindle 30, until the new coil is located at the proper level. This occurs quickly and without interrupting or in any way intefering with the continuous operation of the sharpening machine. The new coil is immediately brought into direct line with the path of the strip through the sharpening region and the sharpening operation proceeds with a full supply of strip stock properly located for the continuous operation of the machine.

In using strip stock as thin as .004 inch each coil may contain somewhat more than 2000 ft. and weigh about 30 lbs. It will be seen therefore that the weight of steel to be handled by the supporting spindle 30 may vary from 120 lbs. to 30 lbs. The fluid pressure system above-described is fully adequate to accommodate the variations in weight thus encountered.

Having thus disclosed my invention and described in detail an illustrative embodiment thereof, I claim as new and desire to secure by Letters Patent:

1. The process of making safety razor blades from thin strip steel in coil form, which includes the steps of arranging a plurality of coils to rotate about a common axis, the trailing end of one coil being welded to the leading end of the next adjacent coil, successively locating each of the coils in a single predetermined position, and drawing the strip in a predetermined path in succession from the coils as so located.

2. The process of making articles from strip stock in coil form, which includes the steps of, drawing the stock always in a predetermined path, the trailing end of one coil being united to the leading end of another coil, causing the coils to rotate in parallel planes about a common axis, shifting one coil into the position formerly occupied by another, and drawing the strip from the coil as it is shifted into line with the said predetermined path.

3. The process of making articles from strip stock in coil form, which includes the steps of causing a pair of coils to rotate about a common axis in parallel planes with the trailing end of the strip of one coil connected to the leading end of the strip of the other coil, drawing the strip from one coil in a predetermined tangential path, whereby the tangential path of the strip is shifted when the strip of the first coil is exhausted, and then moving the second coil to re-establish the initial tangential path of the strip.

4. The process of making articles from strip steel in coil form which includes the steps of mounting a series of connected coils for free rotation about a common axis, rotating all the coils at the same rate by drawing steel from the endmost coil of the series, and shifting a fresh coil into the place of each coil as it is exhausted.

5. The process of making razor blades from strip steel in coil form which includes the steps of mounting a series of connected coils for free rotation about a common axis, drawing steel from the lowermost coil and thereby rotating all the coils in unison, leading the steel strip away from the coil in a horizontal path, detecting departure from the said path in changing from an exhausted to a fresh coil, and replacing the exhausted coil when such departure takes place.

6. In a machine for treating strip stock supplied in coil form, coil-handling mechanism including an axially movable support holding a series of connected coils for rotation about a common axis, a freely movable follower positioned by engagement with the strip as it passes away from one coil of the series, and automatic mechanism controlled by said follower for shifting the support to replace an exhausted coil by a fresh coil of connected strip stock.

7. In a machine for treating strip stock supplied in coil form, coil-handling mechanism including an axially movable shaft, a series of disks freely rotatable upon the shaft and carrying connected coils, a floating follower embracing the strip as it passes away from one coil, power operated means for moving the shaft, and operative connections between said follower and the said power operated means for controlling the movement of the shaft.

8. In a machine for sharpening strip steel supplied in coils, coil handling mechanism including an axially movable shaft, disks mounted one above another on the shaft for free rotation and each having a notch in its circumference, coils supported on said disks and connected by strip steel passing from one to another through its said notches, a guide fixed at the height of one disk for directing the steel strip to the machine, a follower embracing the steel strip between the guide and the adjacent coil and lifted by it when the strip itself is lifted by rotation of the next higher notched disk in the series, and power operated mechanism for lowering the shaft controlled in its action by the said movement of the follower.

9. Mechanism for supplying strip steel in a predetermined path from connected coils thereof, comprising a spindle, a series of freely rotatable disks thereon each for supporting a coil, a fluid pressure cylinder, a piston therein which carries the spindle, a hydraulic system for moving the piston and holding it at various fixed levels, and means controlled by the strip for actuating the hydraulic system.

10. Mechanism for supplying strip steel from connected coils thereof, comprising a series of disks rotatable about a common vertical axis, a guide located at the level of one of said disks, a movable follower through which the strip passes in leaving the lowermost coil of the series and entering the guide, and a fluid pressure system controlled by the follower for holding any selected disk at the level of the guide.

11. The combination of a strip grinding machine having strip feeding mechanism and a controlling device for regulating the speed of the feeding mechanism, together with a support for a series of connected coils of strip stock movable to bring one coil after another into feeding position, a fluid pressure system for so moving the support, and operating connections between said system and said controlling device for regulating the action of the system.

12. The combination defined in claim 11 in which the strip feeding means is regulated through a pulley of adjustable effective diameter and the fluid pressure system is regulated through constriction of a valve opening.

STANLEY ATCHASON.

References Cited in the file of this patent

UNITED STATES PATENTS

| Number | Name | Date |
| --- | --- | --- |
| 915,333 | Chandler | Mar. 16, 1909 |
| 1,001,815 | Casgrain | Aug. 29, 1911 |
| 2,221,468 | Bollinger et al. | Nov. 12, 1940 |
| 2,394,466 | Muddiman | Feb. 5, 1946 |
| 2,500,697 | Metzler | Mar. 14, 1950 |
| 2,544,478 | Yedlicka | Mar. 6, 1951 |